United States Patent
Landolt

[11] Patent Number: 5,570,456
[45] Date of Patent: Oct. 29, 1996

[54] ANALOG CIRCUIT IMPLEMENTING A FUZZY LOGIC CONTROLLER

[75] Inventor: Oliver Landolt, Neuchatel, Switzerland

[73] Assignee: CSEM Centre Suisse d'Electronique et de Microtechnique SA - Recherche et Developpment, Neuchatel, Switzerland

[21] Appl. No.: 214,431

[22] Filed: Mar. 18, 1994

[30] Foreign Application Priority Data

Mar. 26, 1993 [CH] Switzerland ........................ 00 924/93
Oct. 8, 1993 [CH] Switzerland ........................ 03 041/93

[51] Int. Cl.⁶ .............................. G06G 7/00; G06F 17/00
[52] U.S. Cl. ............................... 395/3; 395/61; 395/900
[58] Field of Search ........................................ 395/3, 61

[56] References Cited

PUBLICATIONS

IEICE Transactions on Fundamentals of Electronics, Communications and Computer Sciences vol. E75–A, No. 6, Jun. 1992, Tokyo JP pp. 650–654 XP000310882 M. Sasaki et al. "Current–Mode Analog Fuzzy Hardware with Voltage Input Interface and Normalization Locked Loop".

IEEE Transactions on Systems, Man and Cybernetics vol. 23, No. 2, Mar. 1993, New York US pp. 467–477 XP000398705 R. Yager "Element Selection from a Fuzzy Subset Using the Fuzzy Integral".

Fuzzy Sets and Systems vol. 40, No. 3, Apr. 15, 1991, Amsterdam NL pp. 473–489 XP000202697 M. Gupta et al. "Design of Fuzzy Logic Controllers Based on Generalized T–Operators".

Electronics Letters vol. 28, No. 4, Feb. 13, 1992, Stevenage GB pp. 352–354 XP000292285 O. Landolt et al. "CMOS Selfbiased Euclidean Distance Computing Circuit with High Dynamic Range".

Efficient Analog CMOS Implementation of Fuzzy Rules by Direct Synthesis of Multidimensional Fuzzy Subspaces; Mar. 28, 1993; vol. 1; Second IEEE International Conference on Fuzzy Systems Mar. 28 through Apr. 1, 1993; pp. 453–458.

*Primary Examiner*—Robert W. Downs
*Assistant Examiner*—A. Katbab
*Attorney, Agent, or Firm*—Griffin, Butler, Whisenhunt & Kurtossy

[57] ABSTRACT

A controller permits the implementation of at least one fuzzy logic rule. It has a determination circuit of the overall degree of truth of the premisses of the rule and a determination circuit of the value to be supplied at the output. The determination circuit of the overall degree of truth has a plurality of distance determination circuits each supplying a distance value which is equal to zero when a particular condition of the rule is exactly verified, and which is a square-law function of the difference between the input value and the reference value of this condition. A transformation circuit receiving at the input the sum of the distance values for the different conditions delivers a signal representative of the degree of truth of the premisses of the rule.

6 Claims, 7 Drawing Sheets

X = 0

X = 0

X < 0

X > 0

ANALOG CIRCUIT IMPLEMENTING A FUZZY LOGIC CONTROLLER

FIELD OF THE INVENTION

The invention relates to a fuzzy logic controller permitting the implementation of at least one rule, each of said rules having at least one condition consisting of a relational operator between an input variable and a reference value, said controller functioning by attributing to a set of output variables magnitudes which are determined on the basis of predetermined values by weighting each of them by an overall degree of truth of a rule.

BACKGROUND OF THE INVENTION

More particularly the invention relates to a fuzzy logic controller of the type described hereinabove and executed in the form of an analog integrated circuit.

The behaviour of a system may, in principle, be described by a set of "rules" or "functions", each of these "rules" defining, for a given situation, the behaviour of the system in a near future. The behaviour of a dynamic system will be completely described if the set of "rules" available defines its future behaviour on the basis of each of the possible given situations.

According to a conventional approach to the problem, a system is defined by a set of functions (generally functions of several variables). An electronic circuit designed to simulate or control this system, must be able to determine the values taken by these functions for each possible set of values for the input variables of these functions. In the case of particularly complex systems, this conventional approach is virtually impossible to implement using an analog circuit and its implementation by numerical means calls for enormous calculating power as soon as sufficiently accurate results are needed within a sufficiently short reaction time.

To cope with this problem of excessive complexity of the calculating operations a certain number of alternative approaches have been developed. Of these, the approaches developed on the basis of the formalism of fuzzy sets and of fuzzy logic are arousing growing interest. An introduction to fuzzy logic may notably be found in the monthly "La Recherche"—D. Dubois, H. Prade, LA RECHERCHE, 1308, 22, (1991).

Although the mode of operation of the electronic circuit of the instant invention is not fundamentally connected to the formalism of fuzzy logic and could very well be described without making reference thereto, we will use the vocabulary and the concepts commonly associated with this formalism to describe its operation.

In fuzzy logic, the rules of a system are essentially qualitative and are generally expressed in natural language by a statement of the type "IF condition, THEN conclusion" or in tabular form. The statement of a rule will, most generally, comprise several conditions and could present itself in the form of the type "IF X is A and Y is B, THEN Z is C" or of the type "IF X is A or Y is B, THEN Z is C", or also in the form of a complex expression obtained by combining the two above forms. The symbols A, B and C are linguistic terms in this case. One of the many advantages of this qualitative approach of fuzzy logic is that its implementation does not require any very complex or very accurate arithmetical operation.

To simulate (modelisation case) or control (specification case) a system described by rules such as those of fuzzy logic it is necessary to transpose these into numerically evaluable mathematical expressions and in such a way that the dynamics of the system, so described, correspond in satisfactory manner to the idea which a human being could form thereof on the basis of the normal rules of language. From the theoretical point of view, this transposition in quantitative terms can be made using the formalism of fuzzy sets and of fuzzy logic. The terms A, B and C figuring in the above rules will first of all be modelised by fuzzy sets or intervals. A fuzzy set permits the convenient representation of values more or less compatible with the description of a type of situation in which the system to be simulated or controled can be. A fuzzy set A is characterised by membership function $\mu A(x)$ that is able to assume values between 0 and 1; the membership function $\mu A(x)$ is the degree of compatibility of the value taken by the input variable X with the condition "X is A" or, in other words, $\mu A(x)$ is the degree of truth of the statement "X is A". FIGS. 1$a$, 1$b$, 1$c$ and 1$d$ represent examples of graphs of membership functions associated with fuzzy intervals.

In the case in which the premisses of a rule only comprise a single condition, knowledge of the value adopted by the membership function corresponding to this condition immediately determines the overall degree of membership or overall degree of truth of this rule. In the case in which the premisses of a rule comprise several conditions, the overall degree of truth of this rule is determined by combining amongst themselves the degrees of truth of each of the conditions. This operation of combining the degrees of truth or, that is to say of combining the membership functions, can be executed using fuzzy logic operations, such as the MIN operator and the MAX operator which correspond respectively to the terms "and" and "or" in natural language.

In known devices, whether these are constructed about a digital microprocessor or an analog integrated circuit, one evaluates the degree of pertinence of a rule by faithfully reproducing the process taught by the formalism of fuzzy logic. The integrated circuit therefore first evaluates the membership functions as a function of the particular values taken by the input variables Xi, which are associated with the different conditions in the premisses of the rule. Then, the device uses fuzzy logic gates, for examples the "MIN" and "MAX" gates corresponding to the two operators mentioned hereinabove, to evaluate on the basis of said values of the membership functions, the overall degree of truth of the set of conditions constituting the premisses of the rule. FIG. 2 shows a graph corresponding to the overall degree of truth of a rule having two conditions.

Associated to each rule is a set of output values which can either take the form of fuzzy intervals or of real numbers. Said values, supplied as a conclusion of the rule, correspond to predetermined values programmed some way or another into the device, and which are weighted as a function of the overall degree of truth of the premisses of the rule.

The behaviour of a system is most frequently determined by a whole set of rules, the respective degrees of pertinence of which must be simultaneously evaluated. In the simplest case, the input values of the system are such that there is only one rule, with premisses which prove to have a degree of truth different from zero, and the degree of truth of the other rules is zero. In a situation of this kind, one says that a single rule is active and the values of the output variables will be equal to said predetermined values corresponding to the conclusion of the active rule regardless of the degree of truth of the premisses thereof. On the other hand, it is also possible that the system is in an intermediate state, that is that its input variables assume values such as the conditions constituting the premisses of several adjacent rules each have a non zero degree of truth. In this case one says that several rules are active and the device determines the value of the output variables by weighting and averaging the predetermined values associated with the outputs of the various active rules. A process for determining a centre of gravity is often used to effect this weighting and averaging.

There are a number of defects in the method which has just been described for the implementation of rules. In particular, the evaluation of the overall degree of truth of the premisses of a rule by means of "Min" and "Max" gates, for example, is ill suited to implementation in the form of a compact analog circuit.

One object of the instant invention is therefore to overcome this disadvantage of the prior art.

BRIEF SUMMARY OF THE INVENTION

It is thus an object of the instant invention to provide a fuzzy logic controller permitting the implementation of at least one rule, each of said rules having at least one condition consisting of a relational operator between an input variable and a reference value, said controller operating by attributing to a set of output variables magnitudes which are determined on the basis of predetermined values by weighting each of them by an overall degree of truth of a rule, said overall degree of truth being determined by combining the degrees of truth of the different conditions of said rule, said degree of truth of a condition being equal to 1 when the condition is strictly verified and equal to 0 when the condition is considered non verified, said controller having at least one determination circuit of said overall degree of truth and one determination circuit of said magnitudes of the output variables and being characterised in that said determination circuits of the overall degree of truth comprise:

a plurality of distance determination circuits which each supply at the output, a distance signal, the amplitude of which is, on the one hand, zero when said relational operator of the condition is strictly verified between said input variable and said reference value and the amplitude of which is, on the other hand, an increasing function of the absolute difference between said input variable and said reference value when the relational operator between these two magnitudes is not strictly verified;

a summation circuit by rule, realising the sum of the amplitudes of said distance signals obtained for said rule; and at least one transformation circuit receiving said sum supplied by said summation circuit and delivering a signal which is equal to 0 when said sum is greater than a given threshold value, is equal to 1 when said sum is at a minimum and adopts continually increasing values between 0 and 1 when said sum varies between, respectively, said given threshold value and said minimum value.

To simplify understanding of the object of the instant invention, we will first consider an example of a fuzzy rule that may be expressed in the following manner:

If X1+e,dus ~A1 and X2+e,dus ~A2 then Y=B

The above fuzzy rule has two conditions, the term X1 being the input variable of the first condition and the term X2 being the input variable of the second condition, when the terms A1 and A2 are the reference values of the first and of the second condition respectively.

The instant invention is not limited to rules having the form that has just been described. Examination of this particular example should, however, facilitate understanding of the invention.

To evaluate the degree of pertinence of the rule of two conditions hereinabove, a controller according to the invention will comprise two distance determination circuits each supplying a distance signal, the amplitude of which is an increasing function of the absolute difference between the input variable X and the reference value A of one of the two conditions. Each of these increasing functions also being characterised in that its value is substantially zero when the difference between the input value X and the reference value A is substantially zero.

This behaviour as a function of the difference between the input signal and the reference signal is, as can be seen, virtually inverse to that of a classic membership function, the value of which, by definition, approaches zero as the difference between the input value and the reference value of the condition increases.

The summation by rule circuit of the controller of the invention produces a signal equal to the sum of the amplitudes of the distance signals. This summation signal will thus be a function of the set of input variables of all the conditions. In such a case, it is convenient to imagine the set of input variables {X1, X2, . . . , Xn} for the various conditions as the various components of a vector indicating the position of a point $\vec{X}$ in a space of multiple dimensions and similarly to imagine the set of the reference values {A1, A2, . . . , An} for the different conditions, as the different components of a vector indicating the position of a second point $\vec{A}$ in the same space having multiple dimensions.

It is easy to convince oneself that the signal produced by the summation by rule circuit will equal zero when the position of the point $\vec{X}$, defined hereinabove, is identical with the position of the point $\vec{A}$ also defined hereinabove. In addition, the value of the sum will be an increasing function of the amplitude of each of the distance signals which the summation circuit receives at the input. It is thus possible to state that the amplitude of the signal produced by the summation circuit is representative of the distance between the points $\vec{X}$ and $\vec{A}$. It should be stipulated that the word distance here is not limited to the Euclidian distance but that it must, on the contrary, be understood in the more general sense compatible with claim 1 appended hereto.

A controller according to the instant invention also comprises a transformation circuit which makes it possible to obtain, from a signal produced by the summation circuit, the overall degree of truth of the rule.

BRIEF DESCRIPTION OF THE DRAWINGS

Other characteristics of the invention will emerge from the following description given solely by way of example and with reference to the appended drawings in which.

DETAILED DESCRIPTION OF THE INVENTION

Figure 4:
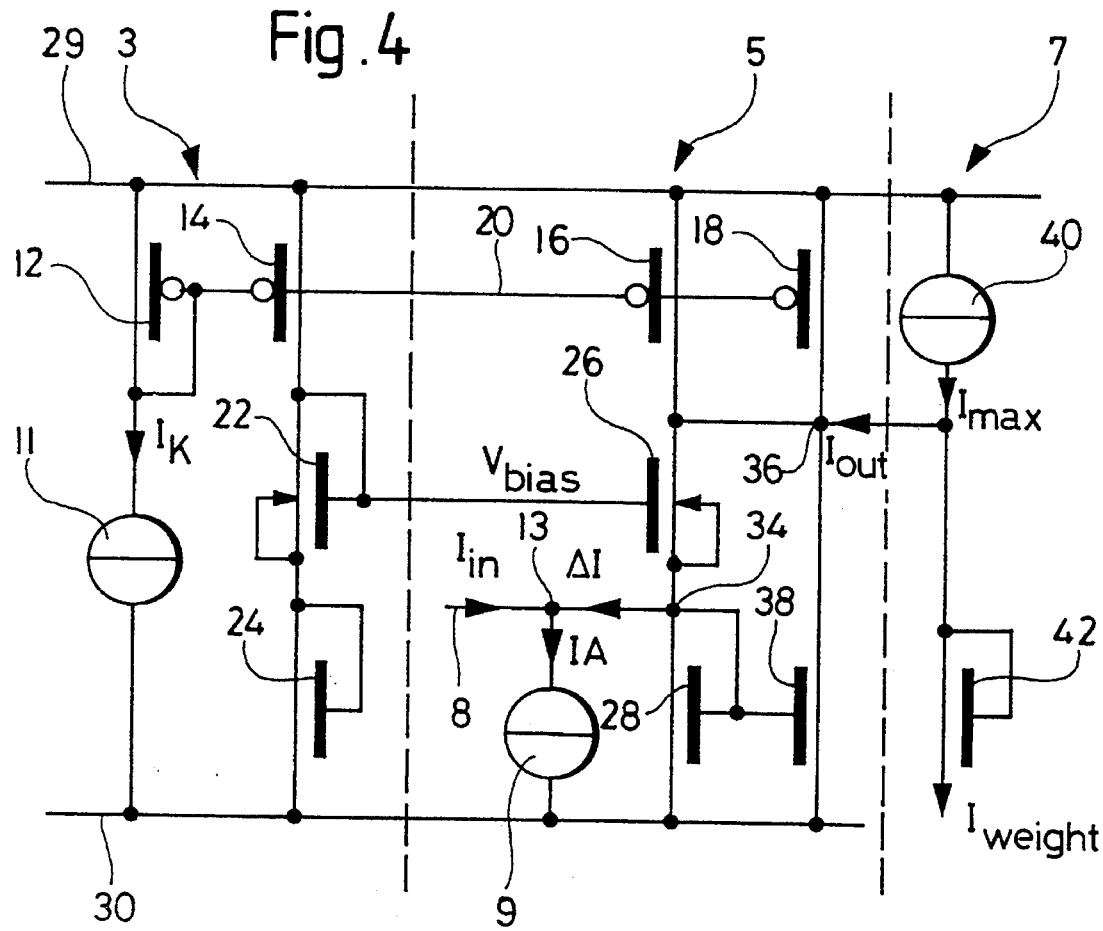
FIG. 4 is the diagram of an example of the determination circuit of the degree of truth of a rule comprising only a single condition.

FIG. 4 shows in diagrammatic form an example of an analog circuit conforming to the instant invention intended to determine the degree of truth of a control rule having a single condition. Since the rule implemented by the circuit of FIG. 4 only has a single condition, this circuit is particularly simple and makes it possible to understand easily the operation of some elements of the instant invention.

The circuit shown in diagrammatic form in FIG. 4 serves to evaluate the degree of truth of a rule, the condition of which may be expressed in the form "If X=A". This circuit may for example be executed using CMOS technology. It should be noted that in the specific embodiment shown here, the values to be treated are the intensities of electric currents. According to the circuit of FIG. 4, the intensity of the input current (Iin) corresponds to the value of the input variable and the intensity of the reference current (IA) corresponds to the reference value.

The electronic diagram of FIG. 4 may be subdivided into three parts. A first part of the circuit with reference 3 is intended to fix a biasing voltage (Vbias). This part 3 is constituted by a current generator 11 producing a bias current (IK), two transistors of type P (references 12 and 14) and two transistors of type N (references 22 and 24). The function of this part 3 is to define the voltage level (Vbias) on the gate of the transistor 22.

A second part of the electronic diagram is constituted by a distance determination circuit 5 which is intended to produce a distance signal as a function of the absolute difference between the input value of the rule (Iin) and the reference value (IA). The circuit element 5 is intended to produce a current proportional to the square of the difference between the intensities Iin and IA supplied at the input. A circuit of this type is known per se and is described for example in an article by K. Bult and H. Wallinga published in IEEE Journal of solid-state Circuits, 357, 22 (1987).

The circuit 5 comprises a current generator 9 a first branch of which, with the transistors 16,26 and 28 is identical to that formed by the transistors 14,22 and 24, of the part of circuit 3, and a second branch comprising the transistors P 18 and N 38 connected in series. The gates of the transistors 18 and 38 are connected to the gates of the transistors 16 and 28 respectively, and the drains of transistors 16 and 18 are connected to each other in such a way that these two transistors in parallel are equivalent to one transistor, the channel width of which is double.

A third part of the electronic diagram with reference 7 is constituted by a transformation circuit of the invention. The circuit 7 comprises a current generator 40 intended to supply a maximum current Imax and a transistor of type N 42 serving as a diode so that the output current is never negative.

Examining now in detail the functioning of the part 3 of the circuit of FIG. 4, which is intended to produce the bias voltage (Vbias), it will be noted that the current generator 11 has its input connected to the drain of the transistor of type P 12, and that these two elements are connected in series between the positive supply line 29 and the ground 30. The intensity of the current passing through the transistor 12 is thus equal to the intensity produced by the generator 11, that is to say to the bias current IK. The transistor 12 and the transistor 14 are also connected in such a way as to form a current mirror of ratio 1. In this arrangement, the current passing through the transistor 14 is also of intensity IK. The figure also shows that the two transistors 22 and 24 are connected in series between the drain of transistor 14 and the ground; they thus also have a current of intensity IK passing through them. The gates of the transistors 22 and 24 are also connected to their respective drains and the bias voltage (Vbias), measured between the gate of the transistor 22 and the ground is thus directly controlled by the intensity of the current IK produced by the generator 11. The voltage (Vbias) is intended to be supplied to the second part 5 of the circuit to serve as bias voltage.

The distance determination circuit 5 receives a current of intensity (Iin) supplied across an input 8. This current is representative of the value of the input variable X for the condition of the rule. The current generator 9 produces for its part a current IA having an intensity that is representative of the reference value A of the condition. When the intensity Iin is such that it exactly balances the intensity IA (X=A), all the current I1 which passes through the transistor 26 also has to traverse the transistor 28 because these two elements are mounted in series. In these conditions, by symmetry, the current in the transistors 26 and 28 is still equal to the current IK passing through the transistors 22 and 24. The current I1 passing through the transistor 26 being of the same intensity as the current I2 passing through the transistor 28 and these two transistors moreover being of similar construction, the voltages V1 and V2 representing respectively the gate-source voltage of the transistors 26 and 28, will be the same. Moreover, the gate of the transistor 26 being maintained at the bias voltage (Vbias), one of necessity always has:

$$V1+V2=Vbias$$

The above equation continues to apply in the general case in which the current Iin does not necessarily compensate the current IA (X≠A). It should also be noted that, in this case, the current I2 which passes through the transistor 28 is no longer equal to the current I1 which passes through the transistor 26. The general equation between the currents is expressed:

$$Iin-IA+I1-I2=0$$

Figure 5:
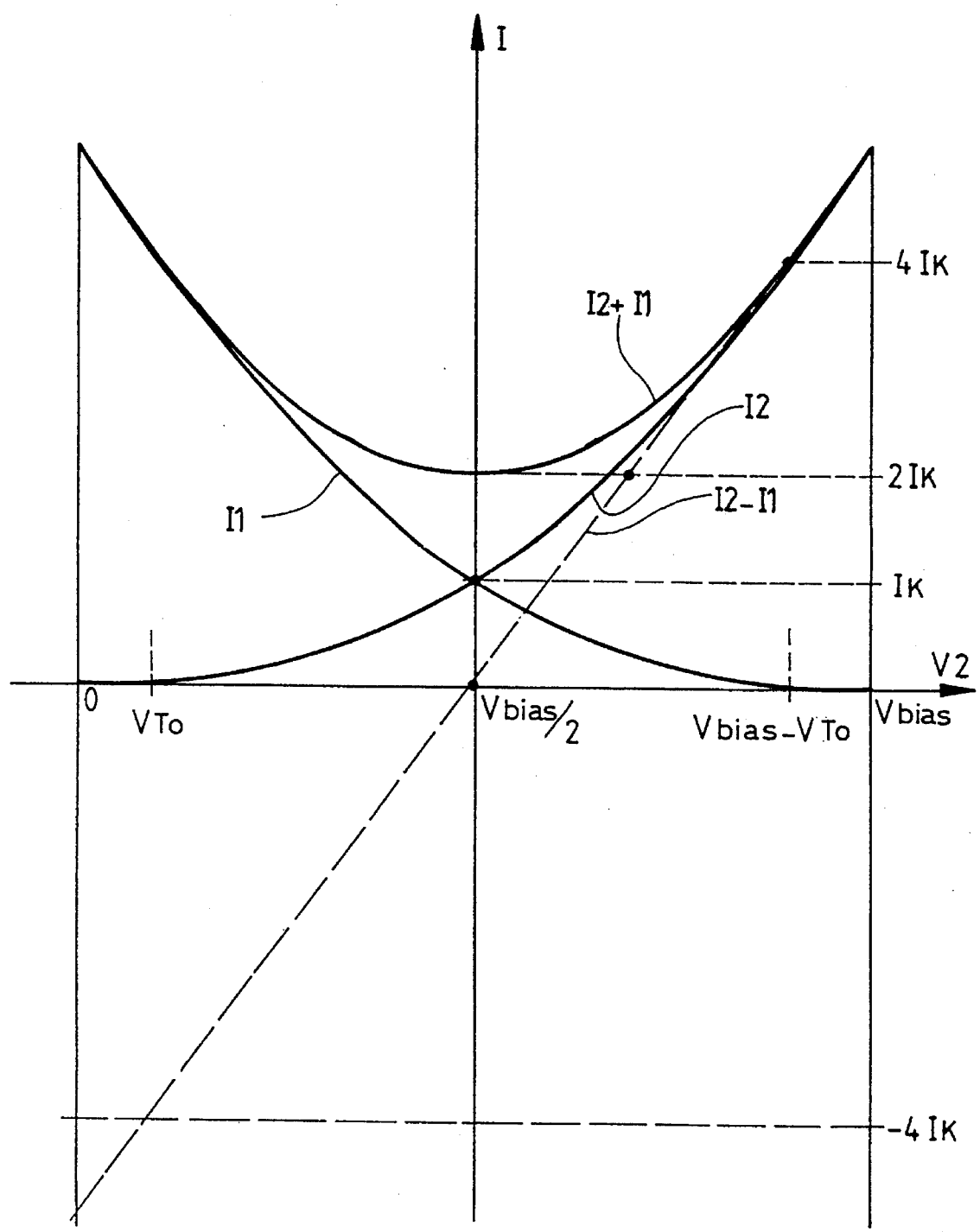
FIG. 5 is the graph of the behaviour of the electric current passing through a pair of MOS transistors connected like the transistors 26 and 28 in FIG. 4.

FIG. 5 is a diagram of the general behaviour of the currents I1 and I2 of FIG. 4, as a function of the voltage V2. It follows from the parabolic shape of the curves of the currents I1 and I2 on the diagram that the difference between the intensities of these two currents (I1–I2) is proportional to the difference between the voltages V1 and V2. Moreover, it also follows from the parabolic shape of the curves I1 and I2 that the sum of the intensities of these currents decomposes in a first constant term equal to twice Ik and to a second term proportional to the square of the difference between the voltages V1 and V2. These observations enable us to conclude that:

I1+I2 is equal to 2Ik+one term that is proportional to the square of I1–I2.

It should also be noted that the intensity of the current passing through the transistor 38 is equal to I2 because the transistors 28 and 38 are in a current mirror configuration.

It may be concluded from consideration of the above that the intensity of the current Iout circulating between the circuit element 5 and the circuit element 7 is given by the following equation:

$$0=2Ik+Iout-I1-I2$$

It is possible to establish that the current Iout is such that:

$$Iout=\tfrac{1}{8}Ik*(Iin-IA)^2$$

The output signal supplied by an integrated circuit such as that which has just been described will not behave according the above equation except with limited accuracy. Nonetheless, in the present application, it is the qualitative behaviour of the signal which is the determining factor.

Figure 1A:
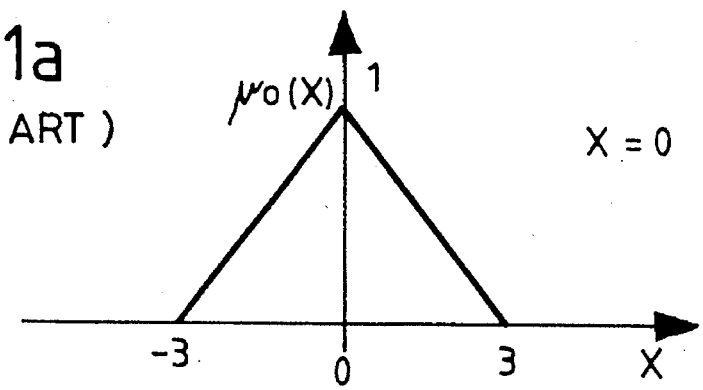
FIGS. 1a and 1b are graphs of two examples of membership functions corresponding to the fuzzy affirmation "X+e, dus ~0"
Figure 1B:
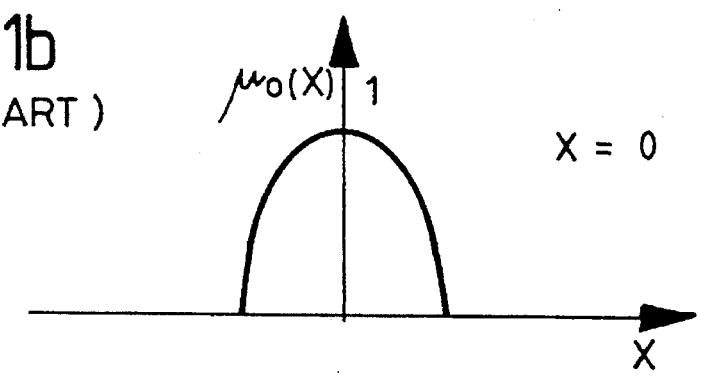

The third part 7 of the circuit of FIG. 4, constituted by the transformation circuit, subtracts the intensity Iout supplied by the part 5 of the circuit from a current of intensity Imax produced by the current generator 40. The current of intensity Iweight resulting from this operation is thus the complement of the signal Iout supplied by the distance determination circuit. The signal Iweight then passes through the transistor 42 which functions as a diode, only allowing the current to pass if its intensity is positive. The graph of the intensity of the current Iweight as a function of the intensity Iin will have the general apearance of the curve of FIG. 1b.

The intensity of the current Iout supplied by the circuit 5 of the present example, is, in conformity with the foregoing, equal to the square of the difference or, more generally, to the square of the Euclidian distance between the two points X and A, divided by 8 Ik. The bias current Ik thus acts as distance normalisation parameter.

The electronic circuit which has just been described therefore supplies a current, the intensity of which is a function of the overall degree of truth of a rule having a single input value of the type:

IF X=A THEN Y=B

Figure 1C:
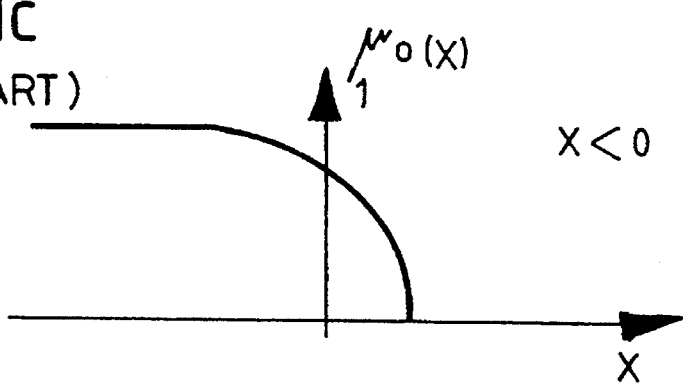
FIGS. 1c and 1d are graphs of two examples of membership functions corresponding respectively to the fuzzy affirmations "X<0" and "X>0"
Figure 1D:
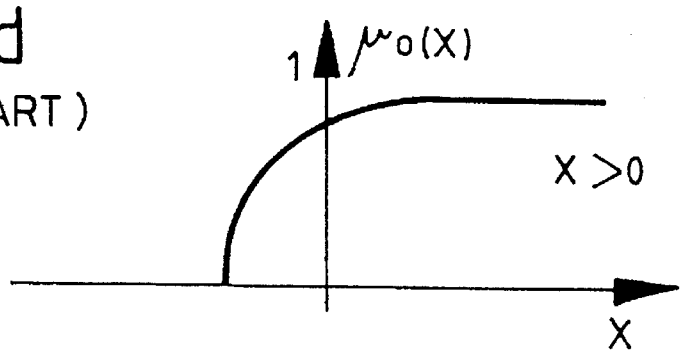
Figure 2:
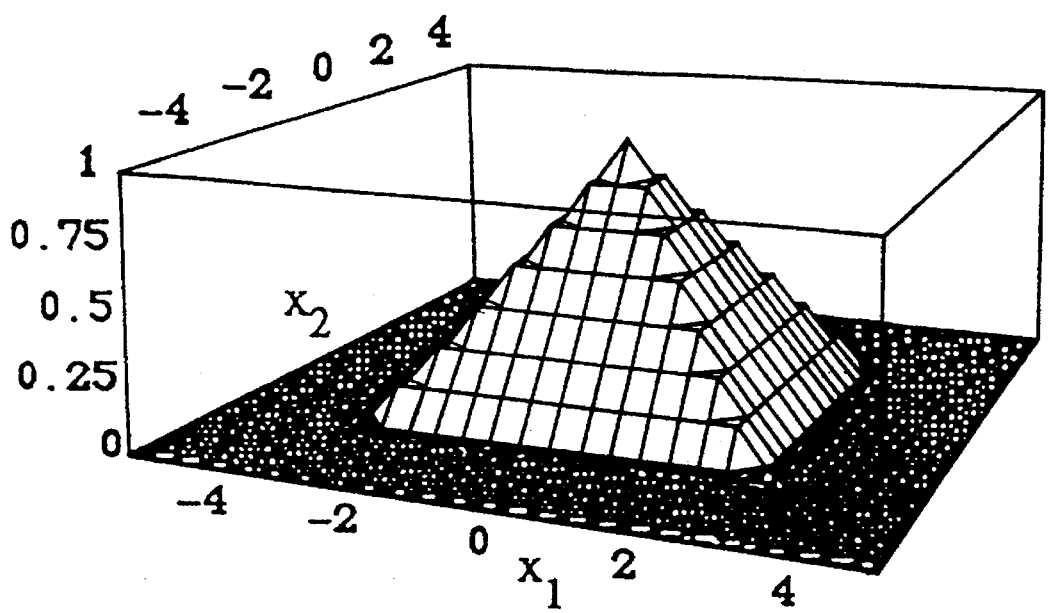
FIG. 2 is the graph of the overall degree of truth of the premisses of a rule having two input variables, obtained in conventional manner by combining two membership functions corresponding respectively to the affirmations "X1+e, dus ~0" and "X2+e,dus ~0".
Figure 3:
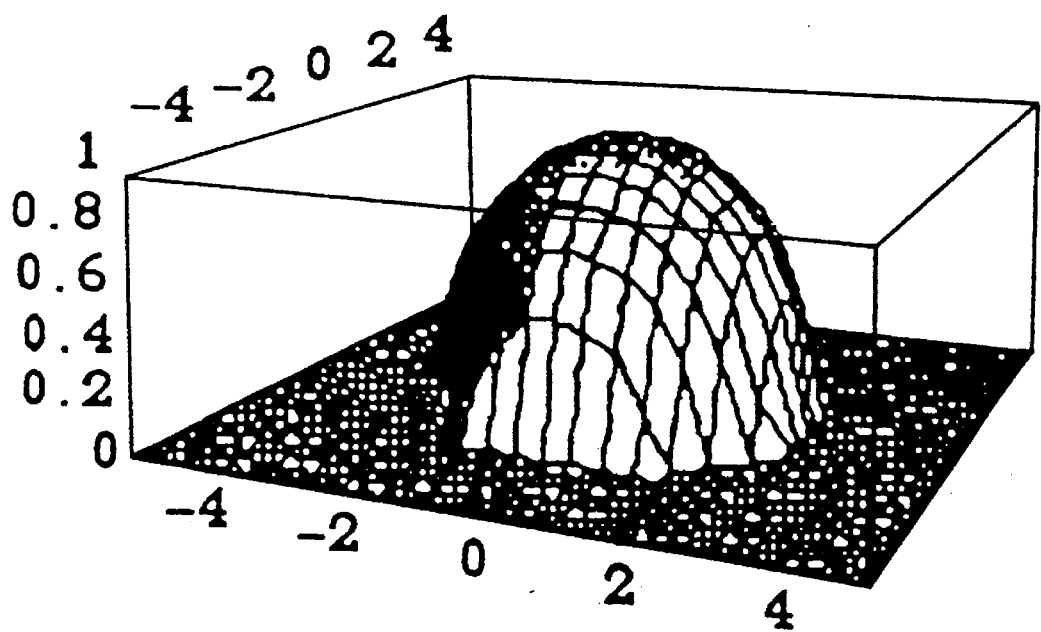
FIG. 3 is the graph of the overall degree of truth of the premisses of the rule of FIG. 2, evaluated according to a special embodiment of the invention by calculating the square of the Euclidian distance.

The FIGS. 1c and 1d give the shape of a signal Iweight produced by two variants of the circuit of FIG. 4 intended respectively to implement rules of the type:

IF X<A THEN Y=B, and

IF X>A THEN Y=B

Figure 6A:
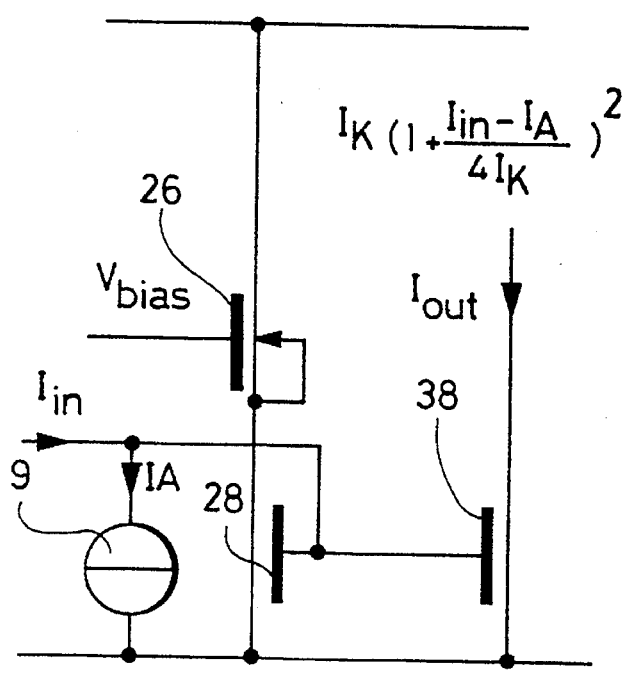
FIGS. 6a and 6b are diagrams of two circuit elements intended to replace the portion of circuit with reference 5 in FIG. 4, to implement the rules the conditions of which respectively take the form of type "X<A" and "X>A"
Figure 6B:
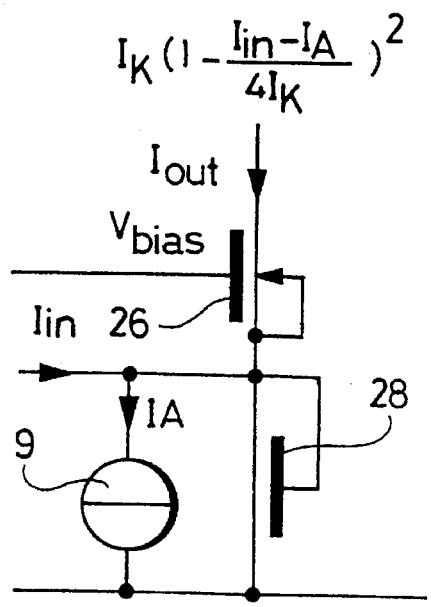

The circuits for the implementation of the two above-mentioned rules are the same as that described in FIG. 4 apart from the part 5 of the circuit which is replaced in both cases by the circuits shown by the diagrams of FIGS. 6a and 6b respectively.

The components comprised in the two circuit elements of FIGS. 6a and 6b and which are also found on FIG. 4 have the same references therein. Reasonings similar to those used hereinabove make it possible to determine that the intensity of the current Iout constituting the distance value produced by each of these circuits depends on the input value Iin according to the following equation:

$$Iout=Ik(1+(Iin-IA)/4Ik)^2 \text{ for FIG. } 6a \text{ and } Iout=Ik(1-(Iin-IA)/4Ik)^2 \text{ for FIG. } 6b$$

FIGS. 1c and 1d give the respective shapes of the signals Iweight generated on the basis of the signals Iout produced in these two variants of the part 5 of the circuit.

Figure 7:
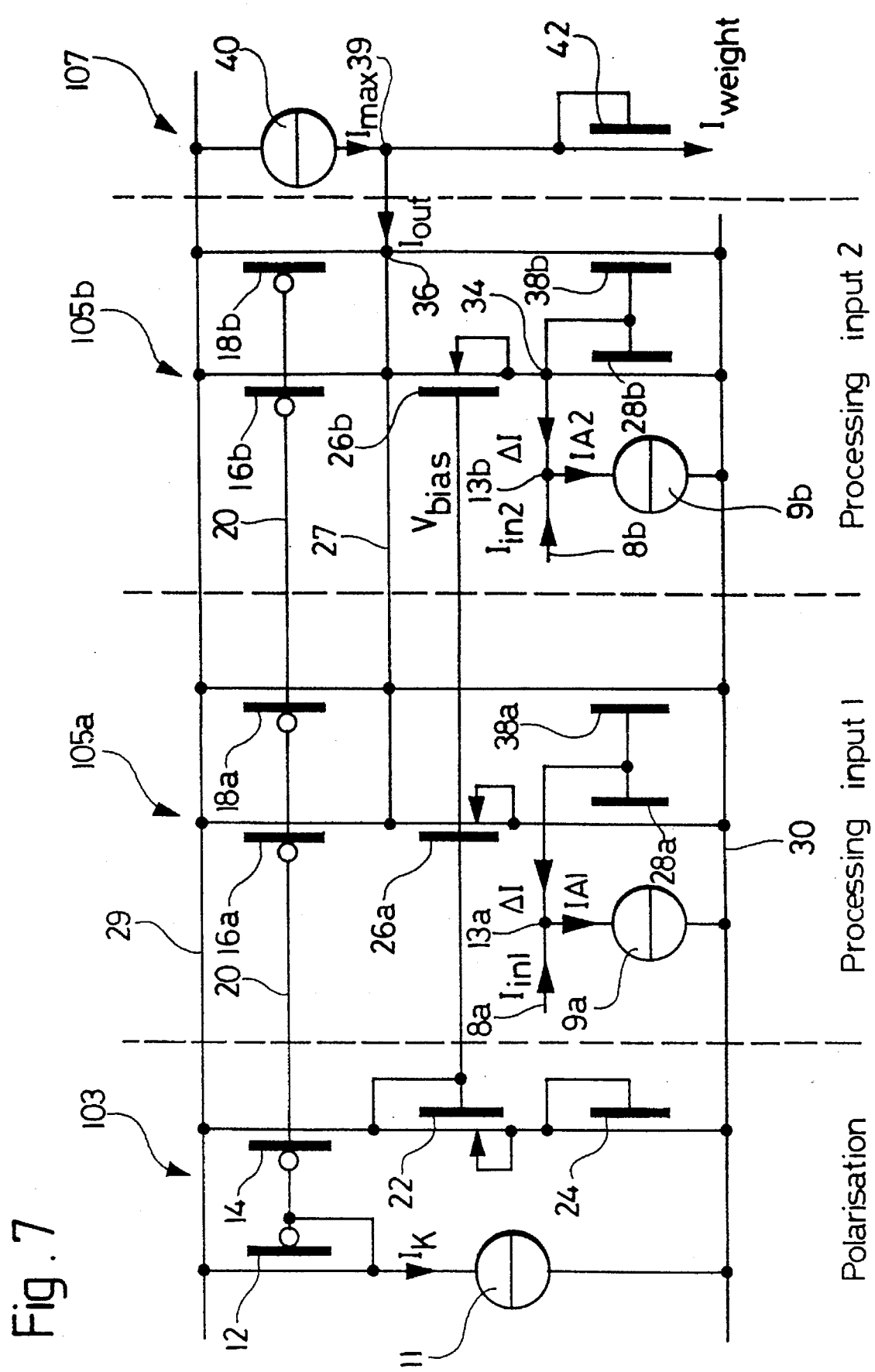
FIG. 7 is the diagram of an example of the determination circuit of the overall degree of truth of a rule having two conditions.

FIG. 7 is the diagram of an analog circuit according to the invention and intended to evaluate the overall degree of truth of a rule having two conditions. This circuit operates according to the same principle as that of FIG. 4 which was described hereinabove.

The electrical diagram of the circuit of FIG. 7 may be subdivided into four parts with references 103, 105a, 105b and 107 respectively. The first part 103 is a circuit intended to define a bias voltage level. This circuit is identical to the circuit 3 of the diagram of FIG. 4 and its various components have the same references on FIG. 7 as on FIG. 4. The reader will be able to refer to FIG. 4 for an explanation of the operation of this circuit.

The second and third parts of the circuit with references 105a and 105b respectively, are each formed by a circuit that is identical to the circuit 5 of the diagram of FIG. 4. Each of these circuits receives an input signal (with references Iin1 and Iin2 respectively) by an input (8a and 8b respectively) and the outputs of these two circuits are both connected to the same node 36 of the circuit of FIG. 7. This node 36 is also connected to the fourth part of the circuit 107. The output connections of the parts 105a and 105b with the node 36 of the circuit constitute the summation by rule circuit according to the invention. In accordance with the invention, the parts 105a and 105b could naturally be replaced for example by the circuits of FIGS. 6a or 6b.

The fourth part of the circuit with reference 107 is identical to the part 7 of the circuit of FIG. 4.

So far we have described a few variants of one embodiment of the instant invention in which the amplitude of the distance signal supplied by each of the distance determination circuits (references 5 on FIG. 4 and 105a and 105b on FIG. 7) is a square-law function of the difference between the intensity Iin and the intensity IA. We will now consider an embodiment in which the amplitude of the distance signal is proportional to the absolute difference between the signal Iin and the signal IA.

Figure 10:
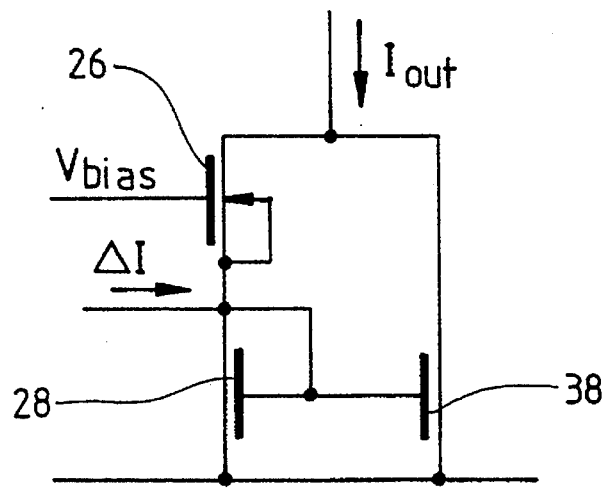
FIG. 10 is the diagram of a distance determination circuit which, according to a different embodiment of the invention, is intended to replace the portion of circuit with reference numeral 5 on FIG. 4 and the portions of circuit 105a and 105b of FIG. 7.

FIG. 10 is the diagram of the squaring current already described in connection with FIG. 4, shown here in its simplest variant. The reference numerals on FIG. 10 are the same as those of the equivalent elements on FIG. 4. Moreover, the gate-source voltages of the transistors 26 and 28 are, as before, designated respectively by V1 and V2 and, similarly, the currents passing through the transistors 26 and 28 are designated I1 and I2 respectively.

In describing FIG. 4, reference was only made to the instance in which the difference between the input current Iin and the reference current IA was less than 4 * IK. In choosing a very low value for IK in relation to the maximum intensities of Iin and IA, it is naturally possible to have a situation in which the difference between Iin and IA is almost always greater than 4 * Ik or, more precisely, a situation in which the difference between Iin and IA is greater than 4 * IK except when the condition of the rule (Iin=IA) is virtually verified.

Reference now being made simultaneously to FIG. 4 and to FIG. 10, it will be noted that, in the situation which has just been described, the intensity of one of the currents I1 or I2 will almost always be substantially zero when the intensity of the other current will be equal to the difference between Iin and IA (shown as ΔI in FIG. 10). Finally, it will be understood that in the circuit of FIG. 10, the current Iout will be equal either to I1 or to I2, that is, at all events, to the absolute value of ΔI, as soon as the condition of the rule is not verified.

The circuit of FIG. 10 therefore forms a distance determination circuit according to the invention which may, for example, replace the part 5 of the circuit of FIG. 4, to make this circuit into a determination circuit of the degree of truth of a rule, in which the intensity of the distance signal is a linear function of the absolute value of ΔI.

Figure 11:
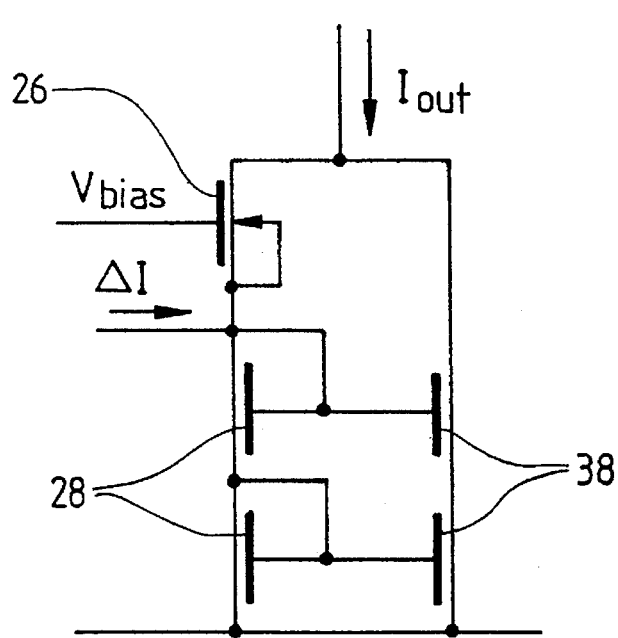
FIG. 11 is another embodiment of the distance determination circuit of FIG. 10.

FIG. 11 is the diagram of a variant of the circuit of FIG. 10 in which the transistors 28 and 38 are replaced by arrangements of the "cascode" type. This variant has the advantage of saturating less rapidly when I1 becomes very large.

Figure 12:
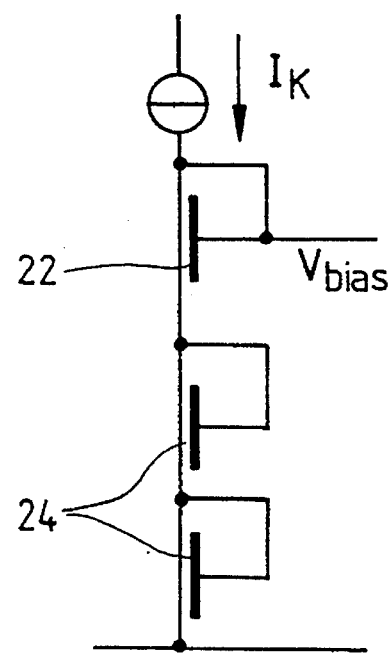
FIG. 12 is the diagram of an element intended to be used in place of the portion of circuit with reference 3 on FIG. 4 in the embodiments which use the distance determination circuit of FIG. 11.

FIG. 12 is the diagram of a circuit provided to replace the part 3 of the circuit of FIG. 4 when the variant of FIG. 11 is used in place of the part 5 of the circuit of FIG. 4.

In the foregoing we have described a few embodiments of a determination circuit of the overall degree of truth in accordance with the invention intended to determine the degree of truth of a rule. We will now describe an embodiment of a determination circuit of the magnitudes of output variables in conformity with the invention which is thus intended to supply the conclusion of said rule. In the present embodiment, the output variables take the form of voltages. More precisely, in the particular embodiment of interest to us, the input and output interfaces of the circuit are such that this latter in effect implements a fuzzy rule which has a form of the type:

"If the intensity of the input current (Iin) is equal to the intensity of the reference current (IA), then the output voltage is equal to a predetermined value (Vi)".

Figure 8:
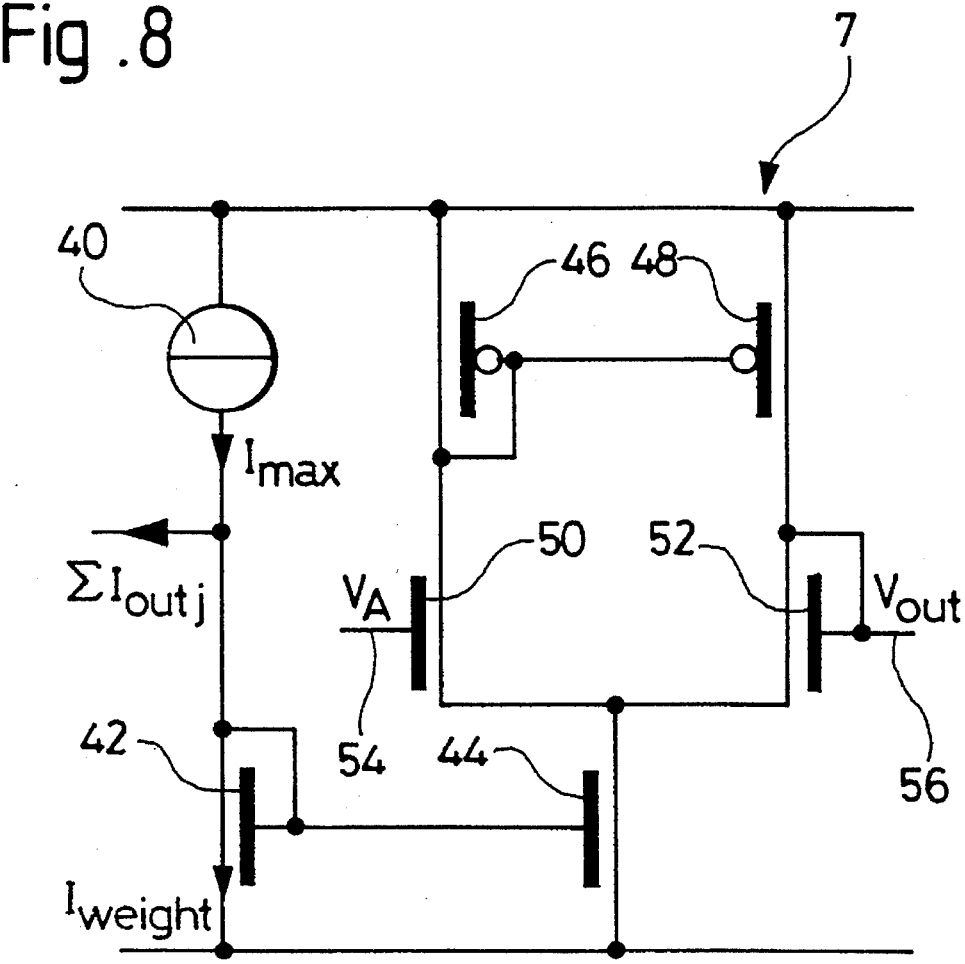
FIG. 8 is the diagram of part of an example of a circuit for the determination of the magnitudes of the output variables of a controller permitting the implementation of several rules.

FIG. 8 is a diagram of an electronic circuit intended to supply the value of an output variable of a rule as from a predetermined value and of the overall degree of truth of said rule, this degree of truth having previously been determined by a different circuit which may be one of those described hereinabove. The diagram of the circuit of FIG. 8 firstly comprises a part identical to part 7 of the circuit of FIG. 4 and thus also identical to the circuit 107 of FIG. 7. This part 7 is repeated from the preceding figures to simplify comprehension, but is is obvious that if, for example, the circuit of FIG. 8 is connected upstream of the circuit of FIG. 4, the part 7 will only appear once in the assembly. The circuit also comprises a part intended to supply an output voltage which, in a first case in which there is only one active rule, is equal to the predetermined voltage VA corresponding to the predetermined value of the rule and, in a second case in which several rules are active, is equal to the sum of the predetermined voltages corresponding to the various conclusions of these rules, this sum being weighted as a function of the respective degrees of truth of the rules.

In conformity with the foregoing, FIG. 8 shows some components which were already shown in FIGS. 4 and 7. These are the current generator 40 and the transistor of the type N 42. FIG. 8 shows that the transistor 42 is associated with a second transistor 44 in a current mirror configuration. The current passing through the transistor 44 thus also has the intensity Iweight. This current serves as bias current for an OTA transconductance amplifier used as voltage follower. FIG. 8 shows that this OTA comprises two transistors of type P 46 and 48 which are also in a current mirror configuration, a first transistor of the type N 50, the drain of which is connected to the transistor 46 and the gate of which is maintained at a predetermined voltage Vi corresponding to the predetermined value of the rule, and a second transistor of the type N 52 the drain of which is connected to the transistor 48 and the gate voltage of which supplies the magnitude of the output variable.

Due to the current mirror configuration, the intensities of the currents passing through the transistors 46 and 48 are the same. Moreover, these transistors being mounted in parallel, the sum of the intensities passing through them is equal to Iweight (provided no current is absorbed by the output Vout 56). In these conditions, the intensity of the currents passing through the transistors 50 and 52 are the same and in consequence the voltage of the transistor grid 52, that is the voltage Vout supplied at the output, will be equal to the voltage Vi applied to the transistor grid 50, that is to the predetermined voltage corresponding to the predetermined value forming the conclusion of the rule. Since the circuits hitherto described herein only consider a single rule, it goes without saying that in accordance with what has been shown, the output voltage is equal to the predetermined voltage Vi corresponding to the conclusion of the rule, and this regardless of the overall degree of truth of this rule, provided that this is not zero.

Figure 9:
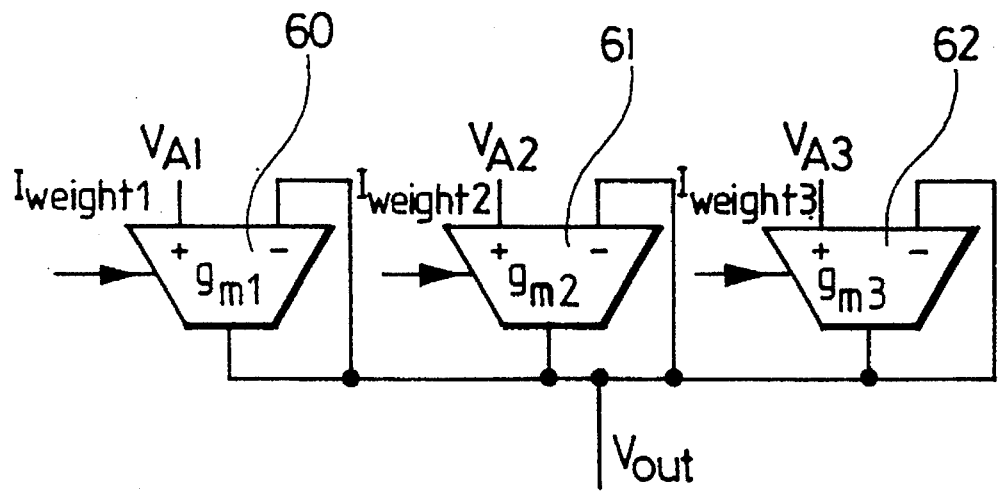
FIG. 9 is the diagram of the connections to be executed between various portions of circuits as that in FIG. 8 to execute a weighted sum of the conclusions of a set of rules.

It is possible to implement several rules simultaneously, having recourse to several circuits identical to that which has just been described. To achieve this, it suffices to connect together the outputs 56 (FIG. 8) of the circuits supplying respectively the magnitudes of the output variables for the conclusions of the various rules. The connections between the outputs of the circuits corresponding to three different rules are shown diagrammatically in FIG. 9 where each of the OTAs of transconductance gm correspond to one version of the circuit of FIG. 8. When the outputs Vout of several rules are connected, the resultant voltage Vout produced by the weighting circuit of FIG. 9 is equal to the sum of the voltages Vi of each rule weighted as a function of the respective degrees of pertinence. $V_{out} = \Sigma g_{mi} VAi/\Sigma g_{mi}$ where gm is the transconductance of the $i^{th}$ OTA.

I claim:

1. A fuzzy logic controller for implementation in an analog circuit and which permits the implementation of at least one rule defining the causal relationship between input variables (X;Iin) and output variables (Y), each rule having at least one condition having a degree of truth, and being expressed by a relational operator between said input variables (X; Iin) and a reference value (A; IA), said controller functioning to supply from a set of said output variables (Y) magnitudes (Vout) which are determined on the basis of predetermined values (VA) by weighing each of them by an overall degree of truth of the rules, said overall degree of truth being determined by combining the degrees of truth of the different conditions of said rule, said degree of truth of a condition being equal to 1 when said condition is strictly verified and being equal to 0 when the condition is considered non-verified, said controller having at least one determination circuit of the overall degree of truth of the different conditions of each of said rules, and further having a circuit for determining said magnitudes (Vout) of said output variables (Y) by weighting said overall degree of truth of said rule, said determination circuit of the overall degree of truth comprising

- a plurality of Euclidian distance determination circuits which each provide at its output, an output current the intensity of which is 0 when said condition between said input variable (X; Iin) and said reference value (A; IA) is verified, and which is an increasing function of the Euclidian difference between each component of said input variable (X;Iin) and of said reference value (A;IA) when said condition is non-verified; and wherein said outputs of said distance determination circuits are each connected to a common node so as to obtain at said common node a summation signal which is equal to the sum (Iout) of the amplitudes of said output currents; and
- at least one transformation circuit for receiving said summation signal and for delivering a signal (Iweight) which equals 0 when said sum is greater than a given threshold value, which equals 1 when said sum is at a minimum value, and which assumes continuously increasing values between 0 and 1 when said sum varies between, respectively, said given threshold value and said minimum value.

2. A control according to claim 1 comprising analog integrated circuits using CMOS technology.

3. A controller according to claim 1 wherein said relational operators are of the type: "equal to", "different from", "less than" or "greater than".

4. A controller according to claim 1 wherein said distance determination circuit comprises:

- a bias circuit supplying a bias voltage; and
- a distance determination circuit having a current generator supplying a reference current (IA) representative of said reference value, means for comparing the intensity of said reference current (IA) and the intensity of a current (Iin) representative of said input variable and to supply on the basis of this comparison said output current.

5. A controller according to claim 4 wherein said transformation circuit has a current generator supplying a current (Imax) representative of the value I, said generator being connected both to said common node and to the output of said transformation circuit via the intermediary of means having a diode effect.

6. A controller according to claim 1 which provides for the implementation of at least two rules and where a weighted output magnitude is produced by a weighting circuit which has a plurality of transconductance amplifiers, each of said amplifiers being associated with one of said rules, and the inputs of each one of said amplifiers receiving one of said predetermined values (VA) and a signal (Iweight) which is representative of the overall degree of truth of said rule and which is supplied by one of said transformation circuits, the outputs of said amplifiers being connected together and supplying said weighted output magnitude.

* * * * *